US009860296B2

(12) United States Patent
Balasaygun et al.

(10) Patent No.: US 9,860,296 B2
(45) Date of Patent: Jan. 2, 2018

(54) SYSTEM AND METHOD FOR END-TO-END CALL QUALITY INDICATION

(75) Inventors: Mehmet Balasaygun, Freehold, NJ (US); Jean Meloche, Madison, NJ (US); Heinz Teutsch, Green Brook, NJ (US); Shalini Yajnik, Berkeley Heights, NJ (US)

(73) Assignee: Avaya Inc., Basking Ridge, NJ (US)

(*) Notice: Subject to any disclaimer, the term of this patent is extended or adjusted under 35 U.S.C. 154(b) by 302 days.

(21) Appl. No.: 13/606,853

(22) Filed: Sep. 7, 2012

(65) Prior Publication Data

US 2013/0250786 A1    Sep. 26, 2013

Related U.S. Application Data

(60) Provisional application No. 61/615,086, filed on Mar. 23, 2012.

(51) Int. Cl.
*H04L 12/66* (2006.01)
*H04L 29/06* (2006.01)
(Continued)

(52) U.S. Cl.
CPC ............ *H04L 65/608* (2013.01); *H04L 41/22* (2013.01); *H04L 41/5032* (2013.01);
(Continued)

(58) Field of Classification Search
CPC ..... H04W 24/00; H04W 24/08; H04W 24/10; H04L 43/08; H04L 43/0823; H04L 43/10
(Continued)

(56) References Cited

U.S. PATENT DOCUMENTS 6,577,599 B1 * 6/2003 Gupta et al. .................. 370/236
6,940,821 B1    9/2005 Wei et al.
(Continued)

FOREIGN PATENT DOCUMENTS

EP    2093948    2/2008
EP    2297901    3/2011
(Continued)

OTHER PUBLICATIONS

Perkins C Ed, "RTP Audio and Video for the Internet, passage," Jan. 1, 2003. RTP Audio and Video for the Internet, Boston, MA, Addison-Wesley, US, pp. 95-111 XP002439431, ISBN: 978-0-672-32249-5.
(Continued)

*Primary Examiner* — Edan Orgad
*Assistant Examiner* — Sithu Ko
(74) *Attorney, Agent, or Firm* — Sheridan Ross P.C.

(57) ABSTRACT

Disclosed herein are systems, methods, and non-transitory computer-readable storage media for generating an end-to-end quality indication associated with a communication session. Based on a real-time transport control protocol message, the system identifies a media path associated with a communication session. Next, the system determines a respective media leg quality for a plurality of media legs in the media path. Based on the respective media leg quality, the system then determines a media path quality. The system can also generate a media quality indication based on the media path quality, and display the media quality indication.

20 Claims, 7 Drawing Sheets

(51) Int. Cl.
*H04L 12/24* (2006.01)
*H04L 12/26* (2006.01)

(52) U.S. Cl.
CPC ............ *H04L 43/06* (2013.01); *H04L 43/062* (2013.01); *H04L 43/0829* (2013.01); *H04L 43/0852* (2013.01)

(58) Field of Classification Search
USPC .................................................. 370/248, 252
See application file for complete search history.

(56) References Cited

U.S. PATENT DOCUMENTS

| | | |
|---|---|---|
| 7,310,334 B1 | 12/2007 | Fitzgerald et al. |
| 7,356,687 B2 | 4/2008 | Medvinsky et al. |
| 7,519,006 B1 | 4/2009 | Wing |
| 2003/0065917 A1 | 4/2003 | Medvinsky et al. |
| 2003/0072269 A1 | 4/2003 | Teruhi et al. |
| 2003/0142625 A1* | 7/2003 | Wan et al. .................... 370/235 |
| 2003/0156550 A1* | 8/2003 | Burmeister et al. .......... 370/252 |
| 2003/0221099 A1 | 11/2003 | Medvinsky et al. |
| 2004/0057420 A1* | 3/2004 | Curcio et al. ................. 370/352 |
| 2004/0073641 A1 | 4/2004 | Minhazuddin et al. |
| 2004/0095939 A1* | 5/2004 | Yang ....................... 370/395.52 |
| 2004/0158704 A1 | 8/2004 | Oates et al. |
| 2005/0005020 A1 | 1/2005 | Rey et al. |
| 2005/0160152 A1* | 7/2005 | Selin et al. .................... 709/217 |
| 2005/0243733 A1* | 11/2005 | Crawford et al. ............. 370/252 |
| 2006/0227717 A1* | 10/2006 | van den Berg et al. ...... 370/252 |
| 2006/0268300 A1 | 11/2006 | Suzuki |
| 2006/0268845 A1* | 11/2006 | He et al. ........................ 370/352 |
| 2006/0285149 A1* | 12/2006 | Dei ................................ 358/1.15 |
| 2007/0115963 A1 | 5/2007 | Vadlakonda et al. |
| 2007/0230361 A1 | 10/2007 | Choudhury |
| 2007/0280127 A1* | 12/2007 | Connor et al. ................. 370/252 |
| 2008/0002576 A1* | 1/2008 | Bugenhagen ......... H04L 41/147 370/229 |
| 2008/0031145 A1* | 2/2008 | Ethier et al. .................. 370/248 |
| 2008/0062887 A1 | 3/2008 | Parolkar et al. |
| 2008/0069002 A1* | 3/2008 | Savoor et al. ................. 370/241 |
| 2008/0162714 A1* | 7/2008 | Pettersson ..................... 709/231 |
| 2008/0205390 A1* | 8/2008 | Bangalore ............... H04L 65/80 370/389 |
| 2009/0080336 A1* | 3/2009 | Zhang et al. .................. 370/248 |
| 2009/0135724 A1 | 5/2009 | Zhang et al. |
| 2009/0135735 A1* | 5/2009 | Zhang et al. .................. 370/253 |
| 2009/0219825 A1 | 9/2009 | Denby et al. |
| 2009/0257361 A1* | 10/2009 | Deshpande et al. .......... 370/252 |
| 2010/0150003 A1* | 6/2010 | Andreasen et al. ........... 370/252 |
| 2010/0198979 A1 | 8/2010 | Pickens et al. |
| 2010/0220195 A1* | 9/2010 | Li et al. ......................... 348/180 |
| 2011/0176427 A1 | 7/2011 | Huang et al. |
| 2011/0222403 A1 | 9/2011 | Suh et al. |
| 2011/0289538 A1* | 11/2011 | Begen et al. .................. 725/107 |
| 2012/0014378 A1* | 1/2012 | Zancker ............... H04L 41/5009 370/352 |
| 2012/0147759 A1* | 6/2012 | Ratnakar et al. .............. 370/252 |
| 2013/0185062 A1* | 7/2013 | Krishnan et al. .............. 704/219 |
| 2013/0235728 A1* | 9/2013 | Le et al. ........................ 370/236 |
| 2013/0250779 A1 | 9/2013 | Meloche et al. |

FOREIGN PATENT DOCUMENTS

| | | |
|---|---|---|
| GB | 2476077 | 6/2011 |
| JP | 2005073211 | 3/2005 |
| WO | WO 2009/155971 | 6/2008 |
| WO | WO 2011/112043 | 3/2011 |

OTHER PUBLICATIONS

U.S. Appl. No. 13/571,098, filed Aug. 9, 2012, Balasaygun et al.
U.S. Appl. No. 13/485,245, filed May 31, 2012, Meloche et al.
Schulzrinne et al, RFC 1889. Jan. 1996.
Schulzrinne et al, RFC 1890. Jan. 1996.

* cited by examiner

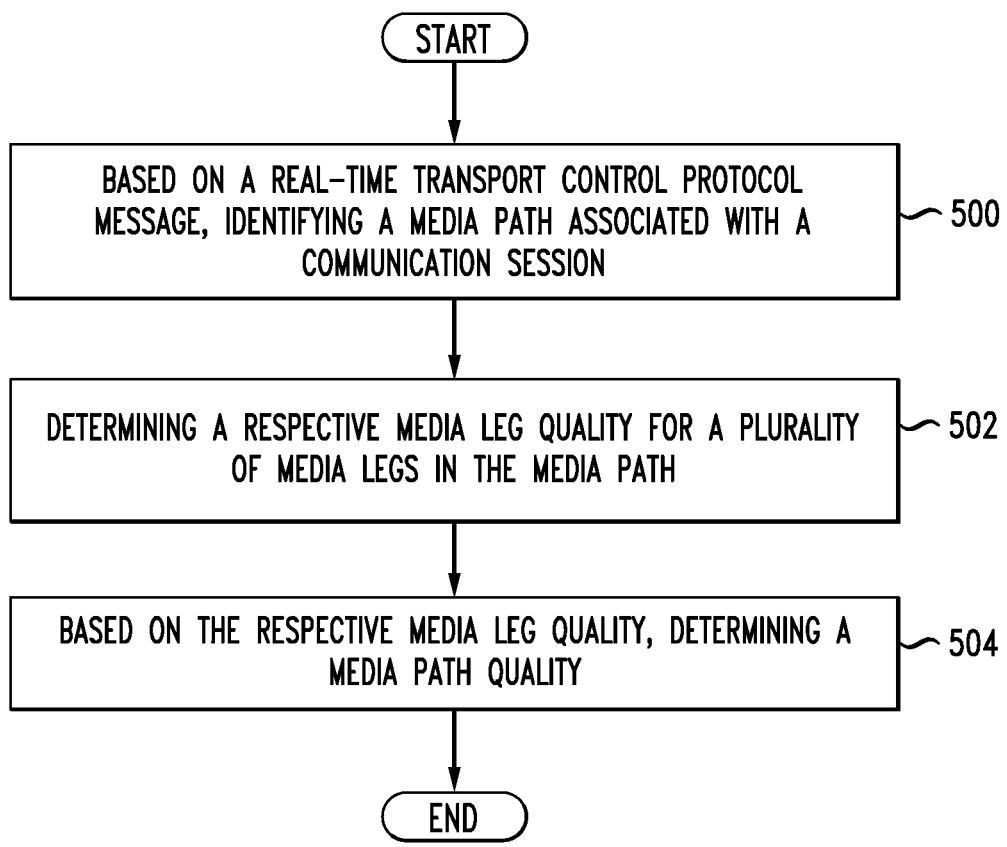

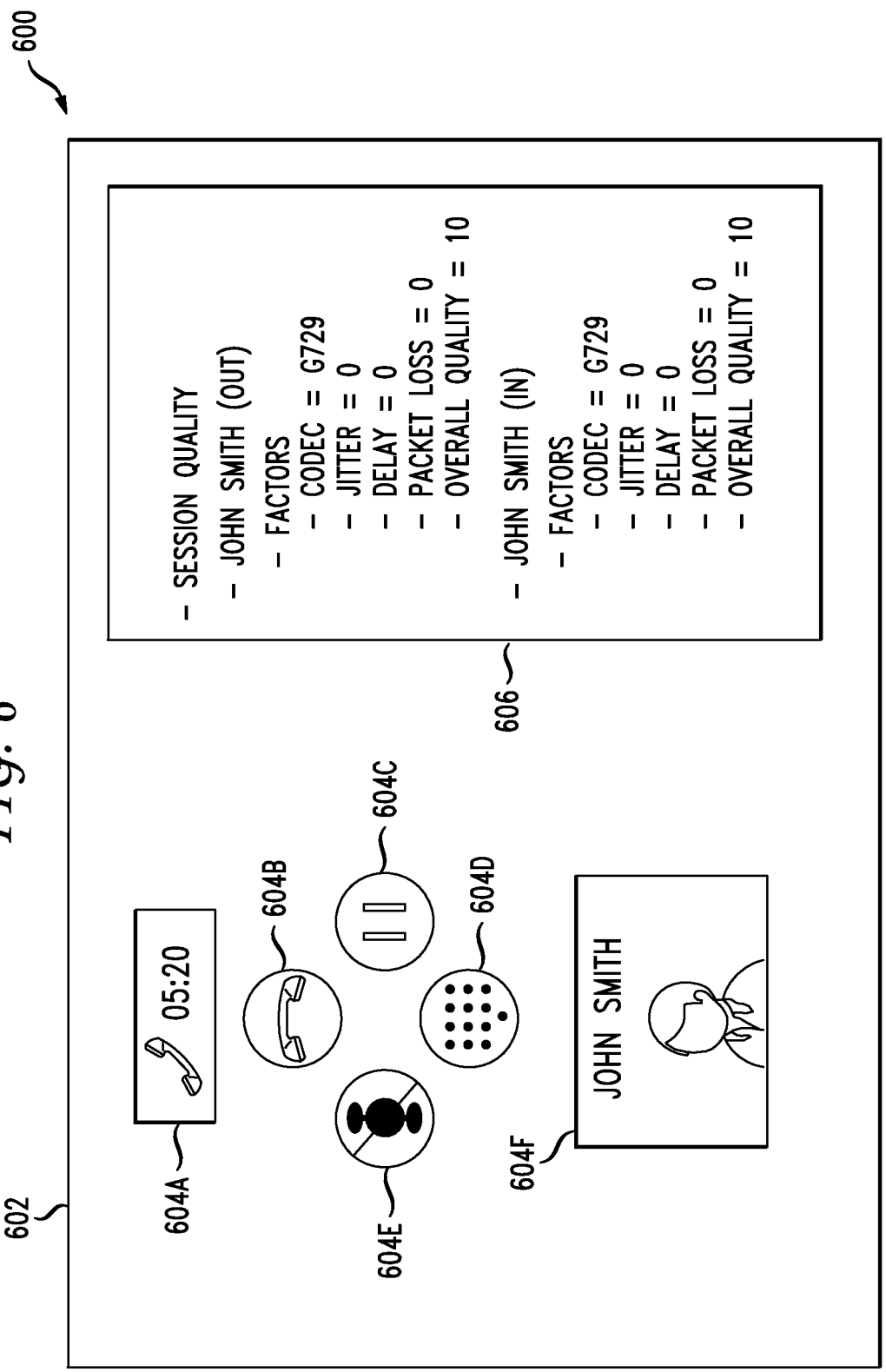

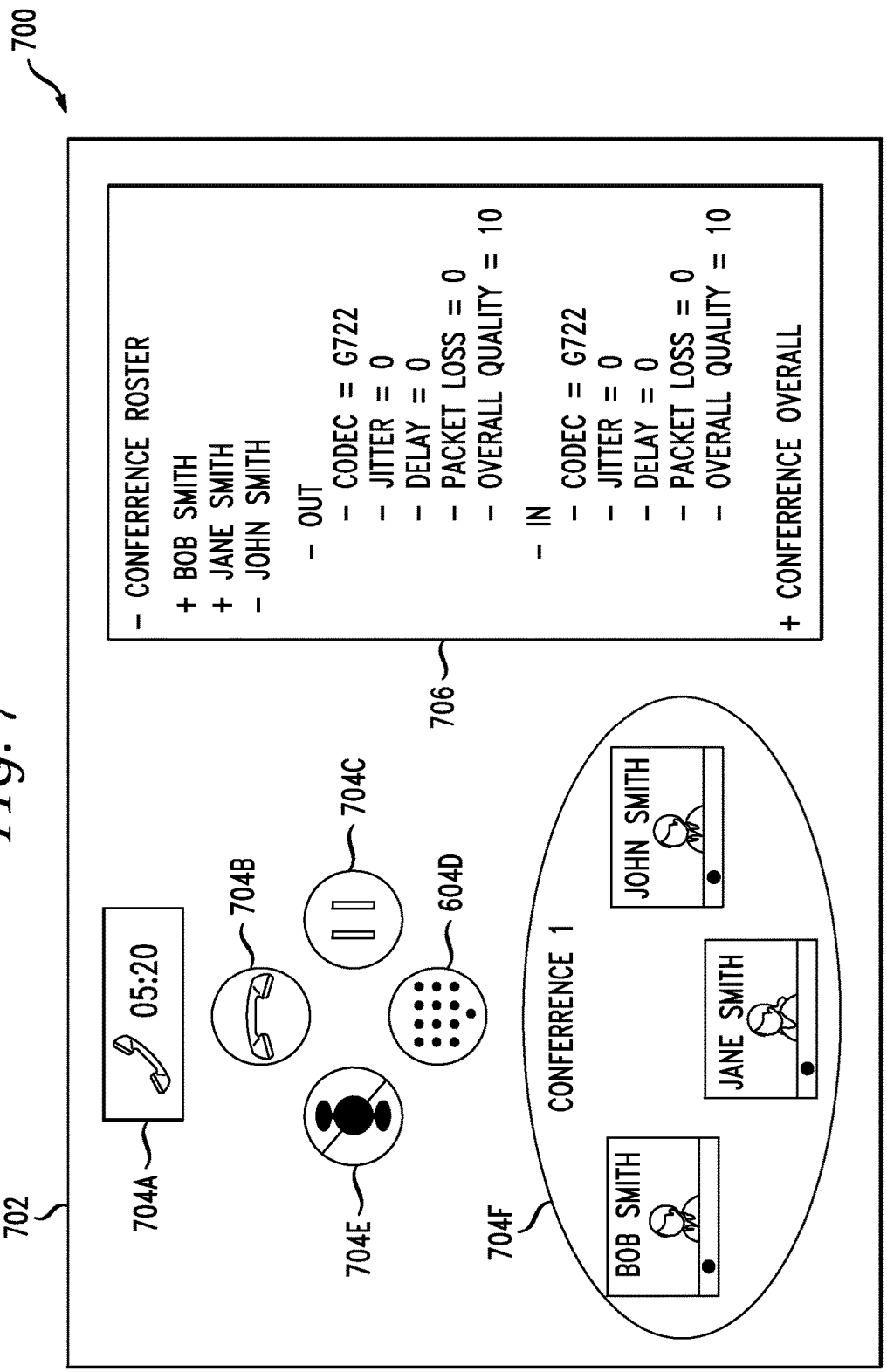

SYSTEM AND METHOD FOR END-TO-END CALL QUALITY INDICATION

PRIORITY CLAIM

The present application claims the benefit of U.S. Provisional Patent Application No. 61/615,086, filed Mar. 23, 2012, which is incorporated herein by reference in its entirety.

The present application is related to U.S. Non-provisional application Ser. No. 13/571,098, filed Aug. 9, 2012; and U.S. Non-provisional application Ser. No. 13/485,245, filed May 31, 2012; which are incorporated herein by reference in their entirety.

BACKGROUND

1. Technical Field

The present disclosure relates to real-time transport control protocol and more specifically to generating an end-to-end quality indication associated with a communication session.

2. Introduction

Troubleshooting media performance issues in a communication session can be an extremely difficult task. When users experience poor audio or video quality during a call, they are typically unable to identify the source of the problem, particularly as the size and complexity of the call increases. Without knowing the source of the problem, users are often left with few—mostly imprecise—troubleshooting measures, such as ending the call to establish a new call, or incrementally muting the phones to isolate the troublemaker. But many times, the problem persists as users exhaust their troubleshooting options. Overall, the process can be long and the experience frustrating and the outcome costly.

Engineers similarly have great difficulty identifying the source of the problem in a call. The resolution of call-quality problems is a formidable challenge precisely because the availability of relevant information is scarce: gathering the necessary information to perform a thorough analysis can be an expensive and onerous proposition. For example, often times, an engineer will receive a complaint from a user reporting poor audio or video quality during a past call. The engineer begins the troubleshooting process by trying to understand the problem. What is the model of the phone being used? Is it a handset or a speaker phone? Is the problem a recurring one? Is the phone shuffling or is a gateway involved? What is the codec being used? Is the gateway transcoding? Is there a bridge involved? Is there packet loss? Answers to these and many other questions are essential to understanding and troubleshooting the problem. Yet currently there are no existing tools that push this information out to the phones or session endpoints. Instead, engineers typically must deploy sniffers on the network to record the actual media received at a particular endpoint, an expensive and laborious process.

Real-time transport control protocol (RTCP) packets can be analyzed to obtain some relevant information. RTCP provides feedback on the quality of data distribution in a real-time transport protocol (RTP) flow. In particular, RTCP packets provide a summary of the quality over a single hop of the media path at the application layer. However, except in the limited case of a pair of shuffling IP phones, the end-to-end media traverses through multiple hops. Consequently, RTCP packets generally do not provide an end-to-end summary of the quality of a session. Thus, engineers do not have effective tools or techniques for measuring the end-to-end quality of a media session. And while session quality for a media session is experienced on an end-to-end basis, engineers are unable to determine which element in the network path is creating the problem when the problem arises.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein provide a fast, efficient, and scalable technique for obtaining end-to-end quality information about a communication session. These approaches allow users and engineers to obtain link-by-link quality of service (QoS) in a fast and cost-effective manner. The end-to-end quality information can provide an overall view of the communication session, as well as a summary of each hop involved in the communication session. This information can greatly facilitate the network monitoring and troubleshooting process. For example, end-to-end quality information can be used to determine the network topology in a communication session. Moreover, end-to-end quality information can be used to quickly identify the precise point of failure or weakness in the network path. A user can determine whether other participants in a communication session are able to hear the user throughout the communication session and, if the user experiences a quality issue, he or she can detect where the issue lies. A user can also determine how well the user is able to hear other participants in a communication session, and detect any problems that may exist.

Disclosed are systems, methods, and non-transitory computer-readable storage media for generating an end-to-end quality indication associated with a communication session. Based on a real-time transport control protocol message, the system first identifies a media path associated with a communication session. Next, the system determines a respective media leg quality for a plurality of media legs in the media path. Based on the respective media leg quality, the system determines a media path quality. The respective media leg quality can be based, for example, on a codec, a jitter, a delay, a packet loss, a signal strength, etc. In one embodiment, the system generates a media path quality indication based on the media path quality, and displays the media path quality indication. The media path quality indication can provide a summary of the quality of the media legs in the media path. Moreover, the media path quality indication can provide a summary of the overall quality of the media path associated with the communication session. The media path quality can indicate the quality of the overall media path, the quality of outgoing communications in the media path, and/or the quality of incoming communications in the media path.

In one embodiment, the system determines a quality for each of a plurality of media paths in the communication session to yield a plurality of media path qualities. The system then determines an overall quality for the communication session based on the plurality of media path qualities. The system can generate an indication based on the overall quality and/or one or more of the plurality of media path qualities. The system can then display the indication or transmit the indication to a remote device for display. The indication can include, for example, an alert, a message, an image, an audio, a video, a report, an event, a response, a text, and a signal. The indication can also include a roster of participants and/or devices involved in the communication session. The roster of participants and/or devices can also be expanded to display additional details about the participants and/or devices. For example, the name of a participant as provided in the roster can be expanded to display communication statistics for that participant, quality information for a media path to and/or from that participant, the structure of a path to and/or from that participant, an overall summary of the quality of communications with that participant, and so forth.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an exemplary method embodiment;

FIG. 6 illustrates an exemplary presentation of a call quality indication for a point-to-point call; and FIG. 7 illustrates an exemplary presentation of a call quality indication for a conference call.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for efficiently calculating end-to-end session information and generating end-to-end quality indications associated with a communication session. A system, method and non-transitory computer-readable media are disclosed for implementing real-time transport control protocol to obtain end-to-end session information and generate an end-to-end quality indication associated with a communication session. A brief introductory description of a basic general purpose system or computing device in FIG. 1, which can be employed to practice the concepts, is disclosed herein. A more detailed description of calculating and monitoring end-to-end session information will then follow. The discussion then turns to a description of the exemplary method for providing end-to-end quality indications, as shown in FIG. 5. Finally, the discussion turns to the exemplary presentations of call quality indications, illustrated in FIGS. 6 and 7. These variations shall be discussed herein as the various embodiments are set forth. The disclosure now turns to FIG. 1.

Figure 1:
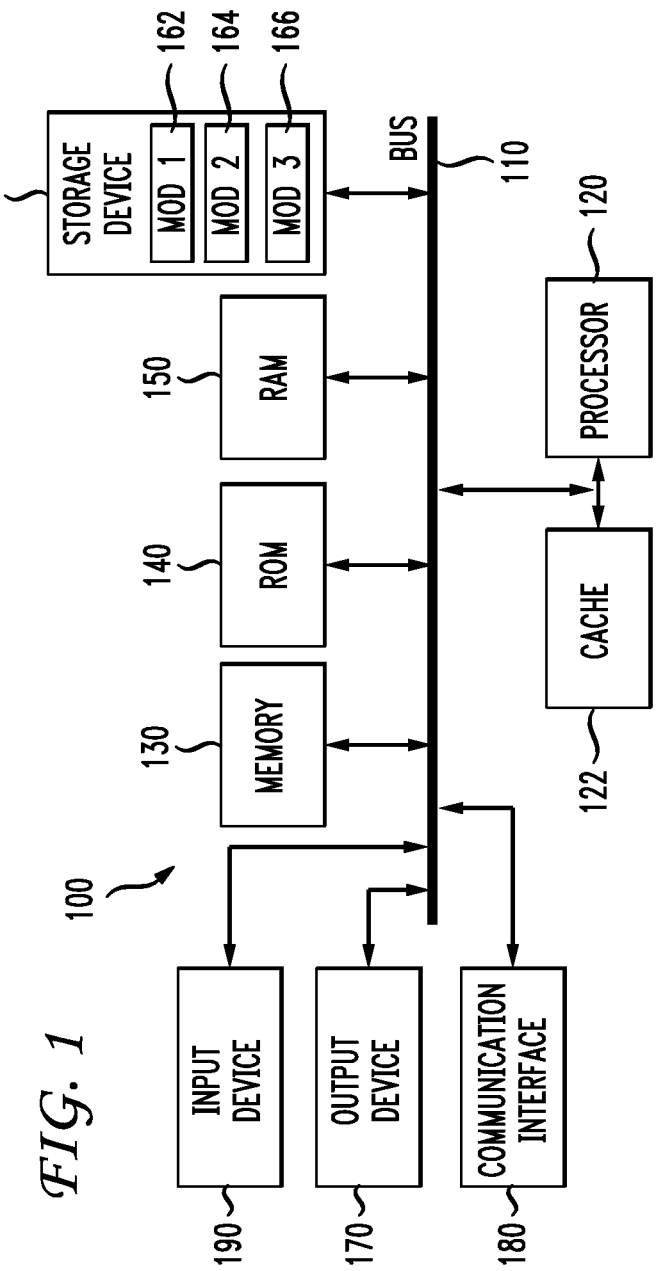
FIG. 1 illustrates an example system embodiment.

With reference to FIG. 1, an exemplary system includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
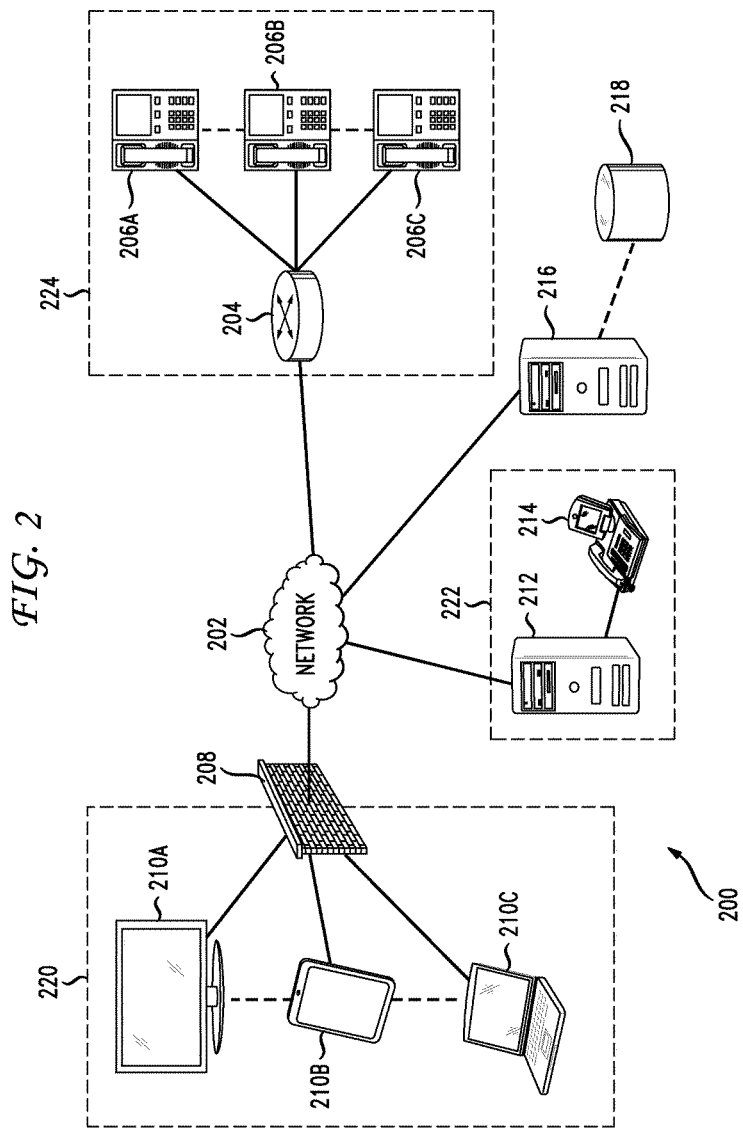
FIG. 2 illustrates an exemplary end-to-end real-time transport control protocol architecture.

Having disclosed some components of a computing system, the disclosure now turns to FIG. 2, which illustrates an exemplary end-to-end real-time transport control protocol architecture 200. Real-time transport control protocol (RTCP) is an extensible protocol that lends itself to both standard and proprietary extensions. To this end, an RTCP extension is implemented in the end-to-end RTCP architecture 200 to provide an indication to media engines involved throughout a call topology that RTCP information needs to be forwarded to one or more destinations.

In FIG. 2, the router 204, the firewall 208, and the servers 212, 216 communicate via a network 202. The network 202 can include a public network, such as the Internet, but can also include a private or quasi-private network, such as an intranet, a home network, a virtual private network (VPN), a shared collaboration network between separate entities, etc. Indeed, the principles set forth herein can be applied to many types of networks, such as local area networks (LANs), virtual LANs (VLANs), corporate networks, wide area networks, and virtually any other form of network.

The voice over IP (VoIP) terminals 206A, 206B, 206C communicate with the network 202 via a router 204; the media devices 210A, 210B, 210C communicate with the network 202 via a firewall 208; and the IP video phone 214 communicates with the network 202 via a Session Initiation Protocol (SIP) server 212. The VoIP terminals 206A, 206B, 206C and the media devices 210A, 210B, 210C can include virtually any device with networking capabilities, such as a computer, a phone, a video game console, a conferencing system, a network media player, etc. As shown in FIG. 2, the network device 210A is an IP television, the network device 210B is a smart phone, and the network device 210C is a laptop computer.

The terminals 206A, 206B, 206C, 210A, 210B, 210C, 214 and the network components 204, 208, 212, 216 can communicate real-time transport control protocol (RTCP) packets with other terminals and network components. The RTCP packets can include RTCP extensions, RTCP data, RTCP messages, RTCP reports, etc. The RTCP extensions, RTCP data, RTCP messages, or RTCP reports can include instructions for transmitting RTCP information, such as RTCP data, based on a triggering event. A triggering event can include a request, a network change, a configuration, a software/hardware change, a task, a command, a communication problem, a media problem, a parameter, a flag, a signal, a threshold, a status, a schedule, a message, an acknowledgment, an instruction, an indication, an error, and so forth. The instructions for transmitting RTCP information can be configured to propagate along the communication session. For example, the terminals 206A, 206B, 206C, 210A, 210B, 210C, 214 and network components 204, 208, 212, 216 can be configured to propagate the instructions to other terminals and network components in the communication session. The instructions can then instruct the terminals 206A, 206B, 206C, 210A, 210B, 210C, 214 and network components 204, 208, 212, 216 to propagate RTCP information along the communication session, based on rules, settings, and/or conditions provided by the instructions. This way, the devices involved in the communication session are able to automatically transmit the RTCP information throughout the communication session.

The instructions can include, for example, a field, a signal, a header, a flag, a message, a report, a rule, an indication, data, etc. Moreover, the instructions can include multiple rules for transmitting RTCP information according to different triggering events. Also, the instructions can include rules specifying the destination address used in transmitting the RTCP information. In one embodiment, the instructions include a list of destination addresses and rules for selecting a destination address from the list. For example, the instructions can specify an IP address as a destination address for periodically transmitting RTCP information, and a different IP address as the destination address for transmitting RTCP information when a threshold is exceeded. In another embodiment, the instructions specify an IP address and port number as the destination address for transmitting RTCP information to nodes residing in the same network segment, and a different IP address and/or port number as the destination address for transmitting RTCP information to nodes residing in other network segments. The instructions can also include alternative addresses for redundancy and flexibility.

In addition, the instructions can include settings, rules, conditions, parameters, policies, commands, and/or tags defining what RTCP information to propagate. For example, the instructions can include rules for propagating a signal strength, a topology, flow statistics, delay information, a media quality, jitter information, codec information, and packet loss information. The RTCP information can include, for example, a differentiated services trace, a global session identifier, a transcoding and gain table, a signal strength, a topology, an access mode, an RTCP packet, an RTCP message, security information, an encryption status, a configuration, routing information, flow statistics, delay information, a noise calculation, a bit rate, a media quality, a session quality, network congestion data, jitter information, a quality of service, codec information, status information, communication details, protocol information, error information, hardware information, hop-by-hop information, information related to network characteristics, etc. In this context, transcoding can refer to switching from one speech codec to another (e.g., G.711 to G.729) within the call path. Moreover, a gain table can refer to a loss and level plan according to specific telecommunication requirements, such as Telecommunications Industry Association (TIA) 912-A requirements. Here, the gain table can be a matrix of gain values that determine what gain/loss a media gateway applies when calls are routed from one trunking domain to another (e.g., analog to/from IP).

The combined RTCP information can be analyzed and used to generate an end-to-end representation of the communication session. For example, the RTCP information transmitted by the terminals 206A, 206B, 206C, 210A, 210B, 210C, 214 can be collected to yield end-to-end RTCP data. The end-to-end RTCP data can then be analyzed to generate an end-to-end RTCP report, which can be, for example, presented to a user, stored at a logging device, and/or provided to a monitoring agent. The end-to-end RTCP data can also be analyzed to determine media quality information and generate a quality indication, which can be, for example, presented to a user or transmitted to another device.

Further, end-to-end RTCP data associated with one or more real-time transport protocol (RTP) streams can be integrated to provide a complete end-to-end picture of the network topology and media performance. Normally, RTCP data is exchanged between adjacent nodes of the network topology with the purpose of providing feedback to adjacent nodes about the network performance that pertains to the RTP stream exchanged between the adjacent nodes. However, when media associated with a communication session traverses other network components, such as a conference bridge or a gateway, the end-to-end media path is divided by segments residing between the adjacent nodes. In this case, the RTCP data exchanged between adjacent nodes represents the performance over a segment of the media path. Thus, the RTCP data for the various segments of the media paths can be integrated to obtain the end-to-end performance of the media path.

For example, RTCP data representing a performance for each of segments 220, 222, and 224 can be integrated to obtain the end-to-end performance of the media path for a communication involving all three segments 220, 222, and 224. To this end, the RTCP data can be collected, for example, at one of the terminals 206A, 206B, 206C, 210A, 210B, 210C, 214, the server 216, or any other device with storage capabilities, and combined to obtain an end-to-end performance calculation. In FIG. 2, the terminals 206A, 206B, 206C, 210A, 210B, 210C, 214 are configured to transmit RTCP data to the server 216, which serves as an RTCP collector. The server 216 stores the RTCP data in a storage 218, which can be local or remote, and analyzes the RTCP data to generate an end-to-end report of the communication session. The server 216 can also forward the RTCP data to another device, such as a monitoring device.

In one embodiment, the terminals 206A, 206B, 206C, 210A, 210B, 210C, 214 use the RTCP channel to communicate RTCP data, such as RTCP reports and extensions, throughout the media topology. RTCP is present throughout the media topology in any multimedia signaling scheme, such as SIP and H.323 signaling. Indeed, RTCP provides a signaling agnostic channel that can be leveraged for RTCP data propagation and dynamic provisioning as set forth herein. Thus, by using the RTCP channel, the terminals 206A, 206B, 206C, 210A, 210B, 210C, 214 can transmit RTCP data end-to-end, circumventing problems that may arise when a device is behind a firewall or a network address translation (NAT) device. For example, the RTCP data can be transmitted to and from any device behind the firewall 208 (media devices 210A, 210B, 210C) via the RTCP channel, provided that appropriate firewall pin holes are opened to allow exchange of RTCP packets bi-directionally.

Moreover, the RTCP information can be used to provide an overall call quality indication for an end user participating on an audio, video, and/or multimedia call. Here, the RTCP information can be used to calculate a media leg quality for the media legs in a media path. The media leg quality for the media legs in a media path can then be used to determine a media path quality, which, in some aspects, can be represented as a media path score. The media legs in a call can be determined based on the layer 7 media topology of the call. For example, in some aspects, if a gateway or any other element in the call is simply passing the media through (e.g., hairpinning) without decrypting the media, then that gateway or element is not considered part of the media topology and, therefore, is not defined as a media leg. A media leg quality can be based on various factors, such as jitter, playout delay, round trip delay, packet loss, packet loss burst, codec used for the call, signal strength, errors, etc. For example, a media leg quality can be a function of the codec used, the jitter, the delay experienced, and/or the packet loss experienced.

When determining a call quality, a different score can be computed for each media path in the call. The different scores can then be used to generate an overall indication of the call quality. For example, the media path scores can be combined, and the average of the media path scores used to determine an overall call quality and/or generate an indication of the overall call quality. Each participant in a call can have a different view of the call quality, since a participant's view can be based on the quality calculations made at that participant's endpoint.

Other exemplary devices which could be connected in the illustrated RTCP architecture 200 include, for example, tablet computers, hand held media players having networking capabilities, personal digital assistants, and vehicles equipped with mobile network access. Each device in the RTCP architecture 200 can be equipped with a capability to produce media communications, including audio, video, text, or any other communication format. Moreover, each device can include media engines which format and manipulate raw data into packets. In some media engines, the raw data can require modulation and manipulation to correctly format the raw data into packets; in other media engines, the raw data simply needs to be formatted and inserted into packet configurations. As those of skill in the art will readily understand, the RTCP architecture 200 can also include many other types of network components, such as bridges, switches, hubs, gateways, databases, endpoints, signaling systems, computer clusters, mixing elements, border elements, multipoint control units, and so forth.

Figure 3:
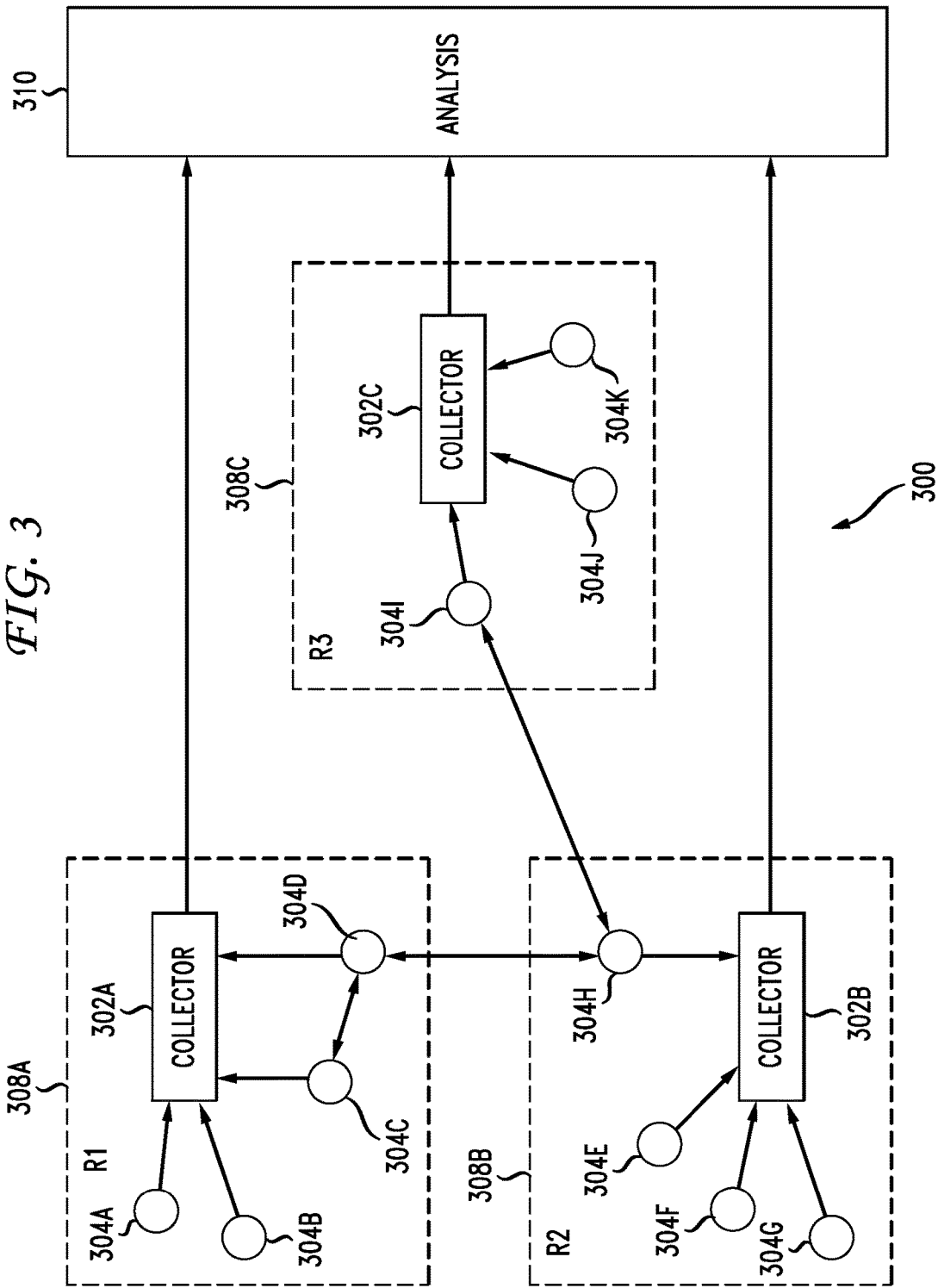
FIG. 3 illustrates an exemplary dual unicast real-time transport control protocol monitoring architecture.
Figure 4:
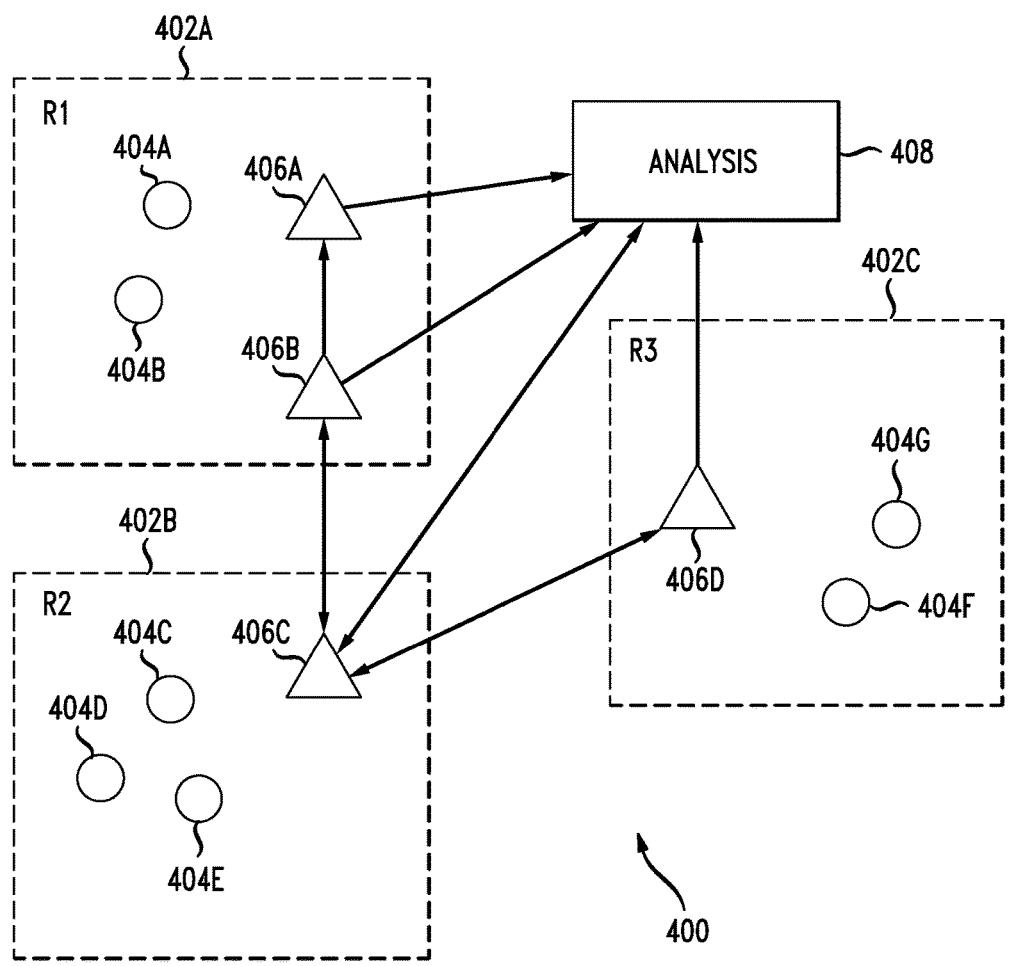
FIG. 4 illustrates an exemplary dynamic dual unicast real-time transport control protocol monitoring architecture.

The discussion now turns to the exemplary real-time transport control protocol monitoring architectures shown in FIGS. 3 and 4.

FIG. 3 illustrates an exemplary dual unicast real-time transport control protocol monitoring architecture 300. The nodes 304A-K are assigned to network regions 308A-C, and the network regions 308A-C are assigned to RTCP collectors 302A-C. The nodes 304A-K are configured to send a copy of their RTCP data to the RTCP collectors 302A-C according to their assigned network regions 308A-C. The collectors 302A-C are configured to collect the RTCP data from the nodes 304A-K and transmit the RTCP data to a centralized location 310 for analysis. The collectors 302A-C can also be configured to implement a query mechanism by which endpoints and network elements involved in an end-to-end media exchange can query the collectors 302A-C to find out about the overall media status associated with the end-to-end media session.

A node can include, for example, a voice engine, a codec, a processor, a compressor, a display, a network interface, a filter, a converter, a controller, an antenna, a bridge, a computer, a phone, a router, a playback device, an input device, a database, a software agent, a gateway, and so forth. The network regions 308A-C can include, for example, one or more networks and/or one or more network segments. The RTCP collectors 302A-C can be any device configured to receive RTCP data, such as a phone, a computer, a server, a storage device, a monitoring device, etc. Moreover, the centralized location 310 can include any device configured to analyze RTCP data. For example, an RTCP collector can be a phone, a server, a node, a computer, a database, a service level agreement (SLA) monitor, a storage device, a software agent, a cluster, a cloud, etc. The centralized location 310 can be in one of the network regions 308A-C, or a separate network and/or network region.

In FIG. 3, nodes 304A-D are assigned to region 308A, which is assigned to collector 302A. Here, nodes 304A-D are configured to send a copy of their RTCP data to collector 302A, and the collector 302A is configured to send the RTCP data from the nodes 304A-D to the centralized location 310. Nodes 304E-H are assigned to region 308B, which is assigned to collector 302B. Thus, nodes 304E-H are configured to send a copy of their RTCP data to collector 302B, which is configured to send the RTCP data from the nodes 304E-H to the centralized location 310. The nodes 304I-K are assigned to region 308C, which is assigned to collector 302C. Accordingly, nodes 304I-K are configured to send a copy of their RTCP data to collector 302C, and the collector 302C is configured to send the RTCP data from the nodes 304I-K to the centralized location 310.

The centralized location 310 receives the RTCP data from the collectors 302A-C and analyses the RTCP data to generate an end-to-end RTCP analysis. The centralized location 310 can analyze the RTCP data in response to a triggering event, such as, for example, a user request, or it can do so periodically according to, for example, a schedule and/or a parameter. The end-to-end RTCP analysis can be used to monitor a communication session, troubleshoot a network problem, calculate an end-to-end quality of service, determine end-to-end security information, collect statistics, manage a communication session, calculate a media path, identify a problem, obtain end-to-end feedback, determine and/or adjust configuration settings, calculate an encryption status/level, determine a network topology, and so forth. The end-to-end RTCP analysis can also be used to generate an end-to-end summary, a session chart, an end-to-end report, and/or any representation of a communication session.

In one embodiment, the collectors 302A-C are configured to implement a query mechanism that allows network elements involved in a call to query the collectors 302A-C for the overall status of the call. The query mechanism can be implemented using an explicit request/response message, or by making uni-directional RTCP streams to collectors bi-directional. Network elements can query the collectors 302A-C according to their network regions, for example. To illustrate, nodes 304A-D can be configured to query collector 302A to obtain information regarding the overall status of the call, as nodes 304A-D and collector 302A reside on the same region (region 308A). This way, the collectors 302A-C can provide overall media status information they obtain from the centralized location 310 to all involved elements in their region. Network elements can also be configured to query collectors in other regions. For example, network elements can be configured to query other collectors based on a schedule, a policy, a configuration, a load, a load balancing need, a flag, a topology, etc. Similarly, the centralized location 310 can be configured to push overall media information to the collectors 302A-C by converting uni-directional RTCP streams from the collectors 302A-C to the centralized location 310 to bi-directional streams. The centralized location 310 can also be configured to push overall media information to the collectors 302A-C by implementing a query mechanism by which the collectors 302A-C can obtain information regarding the overall media status of a call. In some variations, the network elements inside a region do not directly talk to the centralized location 310, but let the centralized location 310 disperse overall quality information to the collectors 302A-C, effectively creating a mechanism by which the centralized location 310 does not get overloaded with traffic from all network elements involved in the media session.

In one embodiment, the end-to-end RTCP analysis is used to generate an alert, a message, and/or an image that identifies a communication problem. For example, the end-to-end RTCP analysis can be used by a phone to display a list/map of devices participating in the communication session, with a visual indication of the status of each device and/or the overall communication session. To illustrate, the phone in this example can display an image of a broken link next to any device with a quality and/or performance level below a specific threshold. The phone can also use colors, numbers, symbols, etc., to indicate a status associated with a device and/or communication session.

In another embodiment, the end-to-end RTCP analysis is used to display a visual representation of the communication session on a touch screen. Here, a user can interact with the communication session through the display. For example, the user can select a node to view additional details about the node. The display can include controls to allow the user to actively control the experience. For example, the user can control the type/amount of information that is collected/ analyzed, the type/amount of information that is displayed, the method/format for displaying such information. Through the display, the user can also perform many other functions, such as transmitting an alert/indication for other devices in the communication session, displaying information at another location, forwarding information to another device, etc.

FIG. 4 illustrates an exemplary dynamic dual unicast real-time transport control protocol monitoring architecture 400. The dynamic dual unicast RTCP monitoring process is similar to the dual unicast RTCP monitoring architecture 300; however, in the dynamic dual unicast RTCP monitoring architecture 400, the process is triggered by an event and the mechanism is distributed through the media topology that is relevant to the particular communication session. To this end, the dynamic dual unicast RTCP monitoring architecture 400 can use RTCP extensions to trigger the process and distribute the mechanism. The dynamic dual unicast RTCP monitoring architecture 400 can use the RTCP channel to distribute the RTCP extensions and any other RTCP data. This way, the RTCP extensions can be transmitted end-to-end, circumventing any problems that may arise when a node is behind a NAT, a firewall, or any other security device. Here, every node in the communication session may be reachable from every other node involved in the media path.

The RTCP extensions can include instructions to forward RTCP data in response to a triggering event, such as when a threshold is reached or a topology change is detected, for example. The RTCP extensions can also include parameters, such as a number of dual unicast RTCP packets that need to be forwarded, the destination address for the dual unicast RTCP packets, etc. The RTCP extensions can also include many additional types of information. For example, the RTCP extensions can include information about security, hardware, network status, transcoding, and any other aspect that is relevant for an end-to-end analysis of the media performance. The process can be triggered from any point in the media topology, at any time during the communication session. The triggering event can originate from any user or device associated with the communication session. Moreover, the triggering event can be automated or manually generated.

In FIG. 4, the dynamic dual unicast RTCP monitoring architecture 400 includes nodes 404A-G and 406A-D, which reside in multiple network regions 402A-C, and a centralized location 408 for collecting RTCP data. As one of ordinary skill in the art will readily recognize, the nodes 404A-G and 406A-D in other embodiments can reside in more or less network regions than illustrated in FIG. 4.

Nodes 406A-D represent the nodes involved in a particular communication session in the dynamic dual unicast RTCP monitoring architecture 400, and nodes 404A-G represent other nodes, which are not involved in the communication session. Here, nodes 406A-D forward RTCP data to the centralized location 408 based on forwarding instructions. The forwarding instructions propagate through the media topology that is relevant to the communication session (e.g., nodes 406A-D) to direct the relevant nodes in the media topology (e.g., nodes 406A-D).

The forwarding instructions can include instructions for forwarding RTCP data to one or more destination addresses in response to one or more triggering events. A destination address can include a port number, an IP address, a Media Access Control (MAC) address, a hostname, a uniform resource locator, an identifier, and so forth. The destination address in FIG. 4 includes an IP address and a port number associated with the centralized location 408. In one embodiment, the destination address includes one or more nodes 404A-G and 406A-D. In another embodiment, the destination address includes one or more RTCP data collectors residing in one or more networks.

The forwarding instructions can also define the amount and type of RTCP data that needs to be forwarded, as well as any other parameters associated with the forwarding mechanism. The forwarding instructions can be included in an RTP packet and/or transmitted via the RTCP channel as an RTCP extension, for example. An RTCP extension can include additional information associated with the communication session and/or nodes 406A-D, such as parameters, statistics, data, messages, descriptors, errors, options, reports, logs, and so forth.

Further, any device involved in the communication session can operate as an RTCP collector for the communication session. For example, node 406A can operate as an RTCP collector for the communication session. Here, the nodes 406B-D can forward RTCP data to node 406A as specified in the forwarding instructions. Any other node with sufficient resources can similarly operate as an RTCP collector. In FIG. 4, the centralized location 408 operates as an RTCP collector. Accordingly, the centralized location 408 collects the RTCP data forwarded from the nodes 406A-D. The centralized location 408 can also be configured to analyze the RTCP data to generate an end-to-end analysis of the communication session.

The centralized location 408 can analyze the RTCP data in response to a triggering event, such as, for example, a user request, or it can do so periodically according to, for example, a schedule, a parameter, etc. The end-to-end RTCP analysis can be used to monitor a communication session, troubleshoot a network problem, calculate an end-to-end quality of service, determine end-to-end security information, collect statistics, manage a communication session, calculate a media path, identify a problem, calculate an encryption status and/or level, obtain end-to-end feedback, determine and/or adjust configuration settings, determine a network topology, and so forth. The end-to-end RTCP analysis can also be used to generate an end-to-end summary, a session chart, an end-to-end report, and/or any representation of a communication session.

In one embodiment, the end-to-end RTCP analysis is used to generate an indication when a change in the network is detected. For example, the end-to-end RTCP analysis can be used to generate an audible alert when a node joins the communication session. As another example, the end-to-end RTCP analysis can be used by a node, such as a phone, to display a representation of the devices participating in the communication session, with a visual indication of the status of each device and/or the overall communication session. To illustrate, the phone in this example can display an image of a broken link next to a device when a quality and/or performance level associated with the device drops below a specific threshold. The phone can also use colors, numbers, symbols, etc., to indicate a status associated with a device and/or communication session.

In another embodiment, the end-to-end RTCP analysis is used to display a visual representation of the communication session on a touch screen. Here, a user can interact with the communication session through the display. For example, the user can select a node to view additional details about the node. The display can include controls to allow the user to actively control the experience. For example, the user can control the type/amount of information that is collected/analyzed, the type/amount of information that is displayed, the method/format for displaying such information, etc. Through the display, the user can also perform many other functions, such as transmitting an alert/indication for other devices in the communication session, displaying information at another location, forwarding information to another device, etc.

Having disclosed some basic system components and concepts, the disclosure now turns to the exemplary method embodiment shown in FIG. 5. For the sake of clarity, the method is discussed in terms of an exemplary system 100, as shown in FIG. 1, configured to practice the method. The steps outlined herein are exemplary and can be implemented in any combination thereof, including combinations that exclude, add, or modify certain steps.

Based on a real-time transport control protocol (RTCP) message, the system 100 first identifies a media path associated with a communication session (500). The system 100 can identify the media path based on an RTCP message having RTCP information from the various nodes/devices in the media path. For example, the system 100 can identify the media path based on an RTCP message having RTCP information from the various nodes/devices in the media path. Here, the various nodes/devices can be configured to propagate RTCP information along the communication path. The various nodes/devices can also be configured to forward the RTCP information to a centralized location, which can compile the RTCP information and/or store the RTCP information for compilation. The RTCP information can be propagated based on an instruction, a configuration, a rule, a packet, a flag, a parameter, and/or a triggering event such as a schedule, a communication, a status, a request, a message, a signal, etc. Alternatively, the system 100 can identify the media path based on multiple RTCP messages generated by the various nodes/devices in the media path. Here, the various nodes/devices can be configured to propagate RTCP messages along the communication session and/or forward the RTCP messages to a centralized location. The propagated and/or forwarded RTCP messages can be received by the system 100 from the various nodes/devices, a centralized location, and/or a specific node/device in the communication session. The RTCP messages received from the various nodes/devices can then be used to identify the media path.

While RTCP messages can be relayed end-to-end, the frequency at which the RTCP messages are relayed can be reduced as necessary to address scalability concerns. For example, the frequency can be reduced based on the number of participants on a call and/or the complexity of the media topology. Moreover, the RTCP messages can be collected at a centralized location, such as a centralized console/operator application, rather than exchanged among the various nodes/devices in the communication session. Also, the endpoints in the communication session can be configured to query for designated media nodes (e.g., a conference server) to collect media quality and topology information through an out-of-band web services interface, for example.

The RTCP message includes information which can be used to identify the media path in the communication session, such as, for example, hop-by-hop information, routing information, signaling information, flow statistics, a topology, and so forth. The RTCP message can also include information about the communication session, the media path, and the communication performance, such as a differentiated services trace, a global session identifier, a transcoding and gain table, a signal strength, a status, a delay, a log, a configuration, an access mode, an error, an acknowledgement, codec information, feedback information, encryption information, jitter, hardware information, quality of service, packet loss, information related to network characteristics, and so forth. Moreover, the RTCP message can propagate end-to-end in order to provide end-to-end information about the communication session, including the media topology and the quality of service.

Next, the system 100 determines a respective media leg quality for a plurality of media legs in the media path (502). The system 100 can determine the respective media leg quality based on factors such as jitter, playout delay, round trip delay, signal strength, packet loss, packet loss burst, traffic flow, codec used, a status, etc. Factors used in determining the respective media leg quality can be provided in the RTCP message and/or collected by monitoring the communication session. In one embodiment, the media leg qualities are calculated as a function of jitter, delay, codec used, and/or packet loss associated with the respective media legs.

Then, based on the respective media leg quality, the system 100 determines a media path quality (504). The system 100 can determine the media path quality automatically or in response to a triggering event, such as a request, a network change, a status, a communication, an error, a problem, a parameter, a threshold, a schedule, a message, an instruction, a flag, an input, a delay, a network event, etc. Further, the system 100 can determine the media path quality for the media path associated with the communication session by combining the media leg qualities for all the media legs in the media path. The combined media leg qualities can provide an accurate representation of the overall media path quality for the media path. The system 100 can use the combined media leg qualities to provide an indication, a summary, a report, a view, and/or a representation of the overall media path quality for the media path. For example, the system 100 can generate an indication of the overall media path quality, such as an alert, a message, an image, an audio, a video, a report, an event, a response, a summary, a communication, a text, a signal, etc. The system 100 can then display the indication of the overall media path quality on a display on the system 100 or a remote display. The system 100 can also output the indication via an audio playback device, or transmit the indication to another device. In one embodiment, the system 100 generates a call quality indication for an end user participating in an audio, video, or multimedia call. The call quality indication can be generated from the end user's perspective, such that the end user can determine, based on the call quality indication, whether the end user can be heard by other participants in the call, and where a problem lies when the end user experiences a quality issue.

A communication path between two or more devices can include an inward media path and an outward media path. Accordingly, the system 100 can determine an inward media path quality and an outward media path quality to determine the quality of incoming and outgoing communications in the communications session. The system 100 can determine the inward media path quality based on the media leg qualities calculated for the media legs in the inward media path, and the outward media path quality based on the media leg qualities calculated for the media legs in the outward media path. The system 100 can also combine the inward media path quality and the outward media path quality to determine the overall quality of the media path, including both the inward and outward media paths.

Furthermore, a communication session involving multiple participants can include multiple media paths based on the multiple participants. Here, the system 100 can determine a media path quality for each of the multiple media paths, and combine the media path qualities to calculate an overall media path quality for the call. In some aspects, each of the multiple media path qualities can include an inward and outward media path quality for a media path. For example, each of the multiple media path qualities can correspond to an overall media path quality for a media path including both an inward media path and an outward media path. Thus, the overall media path quality can represent the overall quality of the call, including incoming and outgoing communications. The system 100 can then generate an overall call quality indication based on the overall media path quality. For example, A can participate on a conference call on a conferencing server along with B, C, D, and E. A's colleague, F, decides to bridge onto the conference call. This creates a mini-conference call in the media gateway, where the media gateway conference call is linked into the conferencing server conference. B may also be behind a media gateway that transcodes media exchanges with B.

The media topology in this example can be represented as follows:

A<->GW<->CS (link between A and the conferencing server CS);

B<->GW<->CS (link between B and the conferencing server CS);

C<->CS (link between C and the conferencing server CS);

D<->CS (link between D and the conferencing server CS);

E<->CS (link between E and the conferencing server CS); and

F<->GW<->CS (link between F and the conferencing server CS).

In the media topology illustrated above, with respect to communications between A and B, there are 8 media legs (A->Media Gateway, Media Gateway->A, Media Gateway->Conferencing Server, Conferencing Server->Media Gateway, B->Media Gateway, Media Gateway->B, Media Gateway->Conferencing Server, Conferencing Server->Media Gateway), and 2 media paths (A->B, B->A). When determining the call quality for communications between A and B, a different score can be computed for each media path. For example, a score can be computed for media path A->B, and another score can be computed for media path B->A. Each score is a media path quality (MPQ), which can be combined to yield an overall MPQ between A and B. Similarly, when determining the overall call quality for all communications, a different score can be computed for each media path in the conference call. For example, a score can be computed for media path A->B, another score can be computed for media path B->A, and respective scores can be computed for the remaining media paths between all of the participants. Each score can then be combined to yield an overall MPQ for the conference call.

The outward media path quality can be used to determine if a participant in the call can be heard by the other participants. For example, to determine if A can be heard by other participants, the outward media path for A can be determined as follows: for each outward media path (e.g., A->B, A->C, A->D, A->E, and A->F), MPQ=min(MLQi, i=1, . . . , N), where MLQi is the media leg quality i and N is the number of media legs in the outward media path. Here, the quality of the path is determined by its weakest link. The average of the MPQs for all outward media paths can then be used to create an overall summary indication of how well A is heard by the other participants (B, C, D, E, and F).

Moreover, the inward media path quality can be used to determine if a participant in the call can hear the other participants. For example, to determine if A can hear B, C, D, E, and F, the inward media path for A can be determined as follows: for each inward media path (e.g., B->A, C->A, D->A, E->A, and F->A), MPQ=min(MLQi, i=1, . . . , N), where MLQi is the media leg quality i and N is the number of media legs in the inward media path. The average of the MPQs for all inward media paths can then be used to create an overall summary indication of the quality of the incoming media (i.e., how well A is able to hear B, C, D, E, and F).

Each participant in the call has a different view of the call quality, which is based on the outward and inward quality calculations made at each participant's endpoint. Based on the outward and/or inward media path quality for each participant, the system 100 can display an indication, summary, report, view, and/or any other representation of the outward and/or inward call quality. The system 100 can also display an indication, summary, report, view, and/or any other representation of the overall call quality, which is based on all the media path qualities. In one embodiment, the outward media path quality is displayed as a media quality indication, and the inward media path quality is used to troubleshoot a media problem experienced by a participant.

For each participant, the system 100 can provide an indication of the overall quality of the call. The indication of the overall quality of the call can be displayed on the system 100, or a remote device, as a graphical representation of the overall quality of the call, for example. The system 100 can also provide a conference roster list which includes individual quality indicators for the participants in the conference call.

The discussion now turns to the exemplary presentations of call quality indications, illustrated in FIGS. 6 and 7.

FIG. 6 illustrates an exemplary presentation 600 of a call quality indication for a point-to-point call. The presentation 600 can be displayed on virtually any screen or display device. For example, the presentation 600 can be displayed on a smartphone device. The presentation 600 can also be projected on an object, such as a screen or a wall, using a video projector, for example. In FIG. 6, the presentation 600 is presented on a display 602. The presentation 600 includes call features 604A-F, which provide a representation of the call and various functions to allow a participant to interact with the presentation 600 and/or the call. In this example, feature 604A provides the status and length of the call, feature 604B is an end button which allows the participant to end the call, feature 604C allows the participant to pause the call, feature 604D is a virtual key pad which allows the participant to interact with the call, and feature 604E allows the participant to mute and unmute the call. Moreover, feature 604F provides a representation of the other participant in the point-to-point call, and information associated with the participant, such as the participant's name, address, phone number, title, description, message, email, device capabilities, etc. In some aspects, feature 604F can also provide options for interacting with the represented participant via other modes, such as email, messaging, video conference, etc. In addition, feature 604F can provide options for controlling how the participant is displayed and/or represented. For example, feature 604F can provide options for displaying the participant on a separate window or changing the icon/image used to represent the participant. In other aspects, the presentation 600 can include more or less features. Moreover, the features can be displayed in different forms and formats. For example, the features can be displayed using icons, images, text, video, avatars, numbers, characters, colors, and so forth. Indeed, in some aspects, the features can be provided via other modes such as audio, speech, and gestures, rather than provided as a visual display.

The presentation 600 also displays a call quality indication 606. The call quality indication 606 can be displayed as a list of call quality measurements/scores, a report of the call quality, a summary of the call quality, a graphical representation of the call and the call quality, a chart of the call quality, an alert of the call quality, a log of call quality statistics, a video representation of the call quality, an object in a graphical user interface, and so forth. The call quality indication 606 can also be displayed using gestures. For example, the call quality indication 606 can be displayed using icons representing the call and/or various aspects of the call, such as call interruptions, where the icons can be animated to indicate a status, a change in status, a problem, an error, a score, a quality, a disruption, etc. For example, the call quality indication 606 can display a blinking icon to indicate a problem with the item or attribute represented by the icon.

The call quality indication 606 can display an overall quality of the call, an overall quality of incoming communications in the call, and/or an overall quality of outgoing communications in the call. The call quality indication 606 can also display various attributes of the overall call, the incoming communications, and/or the outgoing communications. For example, the call quality indication 606 can display information about the codecs involved in the call, jitter, playout delay, round trip delay, a signal strength, packet loss, packet loss burst, traffic flow, errors, a status of the call, etc.

The call quality indication 606 can be displayed automatically or in response to a triggering event, such as a request, a network change, a status, a communication, an error, a problem, a parameter, a threshold, a schedule, a message, an instruction, a flag, an input, a delay, a network event, etc. In one embodiment, a participant can click on the feature 604F to view the call quality indication 606. The call quality indication 606 subsequently be displayed in response to the participant's input. The call quality indication 606 can provide a view of the call quality. The call quality indication 606 can also provide additional details about the call and the participants. Moreover, the information presented in the call quality indication 606 can be expanded to display additional details. For example, a view of the call can be expanded to provide a view of outgoing and incoming communications in the call. The view of the outgoing and/or incoming communications can then be further expanded to display specific attributes, factors, scores, devices, characteristics, data, statistics, status, and information associated with the respective outgoing and/or incoming communications.

FIG. 7 illustrates an exemplary presentation 700 of a call quality indication for a conference call. The presentation 700 can be displayed on virtually any screen or display device. For example, the presentation 700 can be displayed on a smartphone device. The presentation 700 can also be projected on an object, such as a screen or a wall, using a video projector, for example. In FIG. 7, the presentation 700 is presented on a display 702.

The presentation 700 includes call features 704A-F, which provide a representation of the conference call, and various functions to allow a participant to interact with the presentation 700 and/or the conference call. In this example, feature 704A provides the status and length of the conference call, feature 704B is an end button which allows the participant to end the conference call, feature 704C allows the participant to pause the conference call, feature 704D is a virtual key pad which allows the participant to interact with the conference call, and feature 704E allows the participant to mute and unmute the conference call.

Moreover, feature 704F provides a representation of the conference call and the participants involved in the conference call. For each participant, feature 704F can also provide information associated with the participant, such as the participant's name, address, phone number, title, description, message, email, device capabilities, etc. In some aspects, feature 704F can also provide options for interacting with any of the other participants via other modes, such as email, messaging, video conference, etc. In addition, feature 704F can provide options for controlling how the participants are displayed and/or represented. For example, feature 704F can provide options for displaying the participants on a separate window, or changing the icon/image used to represent each participant. In other aspects, the presentation 700 can include more or less features. Moreover, the features can be displayed in different forms and formats. For example, the features can be displayed using icons, images, text, video, avatars, numbers, characters, colors, and so forth. Indeed, in some aspects, the features can be provided via other modes such as audio, speech, and gestures, rather than provided as a visual display.

The presentation 700 displays a call quality indication 706. The call quality indication 706 can include a graphical representation of the structure of the conference call, a list of call quality measurements/scores, a report of the call quality, a summary of the call quality, a graphical representation of the call quality, a chart of the call quality, an alert of the call quality, a log of call quality statistics, a video representation of the call quality, an object in a graphical user interface, a representation of past and/or live communications in the conference call, a representation of the various participants in the conference call, and so forth. The call quality indication 706 can also include gestures. For example, the call quality indication 706 can include icons representing the conference call and/or various aspects of the call, such as call interruptions, where the icons can be animated to indicate a status, a change in status, a problem, an error, a score, a quality, a disruption, etc. For example, the call quality indication 706 can display a blinking icon to indicate a problem with the item or attribute represented by the icon.

The call quality indication 706 can display an overall quality of the call, an overall quality of incoming communications in the call, and/or an overall quality of outgoing communications in the call. For example, the call quality indication 706 can display an overall summary indication of the quality of the incoming and/or outgoing media. Based on the call quality indication 706, a participant can determine if other participants are able to hear the participant, and if the participant is able to hear the other participants. The call quality indication 706 can also display various attributes of the overall call, the incoming communications, and/or the outgoing communications. For example, the call quality indication 706 can display information about the codecs involved in the call, jitter, playout delay, round trip delay, a signal strength, packet loss, packet loss burst, traffic flow, errors, a status of the call, etc. The call quality indication 706 can also provide video and/or audio alerts indicating a call quality, for example.

Further, the call quality indication 706 can display a conference roster list including the individuals participating in the conference call. The conference roster list can also include individual quality indicators for the participants in the conference call. The individual quality indicators can describe the quality of a media path to the individual participants. Also, the individual quality indicators can include indicators describing an inward media path from the individual participants and/or an outward media path to the individual participants. The call quality indication 706 can thus provide detailed call quality statistics on a user-pair basis.

In one embodiment, the name of a participant as provided in the roster list can be expanded to display communication statistics for that participant, quality information for a media path to and/or from that participant, the structure of a path to and/or from that participant, an overall summary of the quality of communications with that participant, and so forth. In another embodiment, an image representation of a participant listed in the roster list can be selected to display an expanded summary of communication statistics for that participant, quality information for a media path to and/or from that participant, the structure of a path to and/or from that participant, an overall quality of communications with that participant, and so forth.

The call quality indication 706 can be displayed automatically or in response to a triggering event, such as a request, a network change, a status, a communication, an error, a problem, a parameter, a threshold, a schedule, a message, an instruction, a flag, an input, a delay, a network event, etc. In one embodiment, a participant can click on the feature 704F to view the call quality indication 706. The call quality indication 706 can then be displayed in response to the participant's input. The call quality indication 706 can provide a view of the call quality. The call quality indication 706 can also provide additional details about the call and the participants. For example, the quality indication 706 can provide the structure of a conference call. Moreover, the information presented in the call quality indication 706 can be expanded to display additional details. For example, a view of the call can be expanded to provide a view of outgoing and incoming communications in the call. The view of the outgoing and/or incoming communications can then be further expanded to display specific attributes, factors, scores, devices, characteristics, data, statistics, status, and information associated with the respective outgoing and/or incoming communications.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. A computer-readable storage medium or device expressly excludes transitory signals per se and transitory mediums such as carrier waves, wires, cables, fiber optics, infrared medium, and the like. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
identifying, via a processor, an inward media path associated with a communication session and an outward media path associated with the communication session, based on Real-time Transport Protocol Control Protocol (RTCP) messages propagated from nodes in the inward media path and the outward media path to a plurality of collectors, each of the inward media path and the outward media path comprising a plurality of media legs, wherein the inward media path is associated with incoming traffic associated with the communication session and the outward media path is associated with outgoing traffic associated with the communication session;
receiving, at a central location and from the plurality of collectors, a plurality of media leg quality measurements contained in the RTCP messages, each of the plurality of media leg quality measurements being associated with a respective media leg of the plurality of media legs;

based on at least a first media leg quality measurement and a second media leg quality measurement of the plurality of media leg quality measurements, generating a respective end-to-end performance measure for each of the inward media path and the outward media path;

determining a quality for each of the inward media path and the outward media path to yield an inward media path quality and an outward media path quality; and determining an overall quality for the communication session based on the end-to-end performance measure for the inward media path and the end-to-end performance measure for the outward media path and the inward media path quality and the outward media path quality.

2. The method of claim 1, wherein the end-to-end performance measure is based on at least one of a codec, a jitter, a delay, or a packet loss of two or more of the plurality of media legs.

3. The method of claim 1, further comprising displaying one of an indication, a summary, or a representation of the overall quality.

4. The method of claim 1, further comprising generating an indication based on the overall quality, wherein the indication comprises one of an alert, a message, an image, an audio, a video, a report, an event, a response, a text, or a signal.

5. The method of claim 1, further comprising generating a media quality indication based on at least one of the respective end-to-end performance measure for the inward and outward media paths.

6. The method of claim 1, further comprising displaying a media quality indication based on at least one of the respective end-to-end performance measure for the inward and outward media paths.

7. The method of claim 1, wherein determining the respective end-to-end performance measure is based on a triggering event.

8. The method of claim 7, wherein the triggering event comprises a node joining the communication session.

9. A system comprising:
a processor; and
a computer-readable medium storing instructions which, when executed by the processor, cause the processor to perform operations comprising:
identifying an inward media path associated with a communication session and an outward media path associated with the communication session, based on RTP Control Protocol ("RTCP") messages propagated from nodes in the inward media path and the outward media path to a plurality of collectors, each of the inward media path and the outward media path comprising a plurality of media legs, wherein the inward media path is associated with incoming traffic associated with the communication session and the outward media path is associated with outgoing traffic associated with the communication session;
receiving, from the plurality of collectors, a plurality of media leg quality measurements contained in the RTCP messages, each of the plurality of media leg quality measurements being associated with a respective media leg of the plurality of media legs;
based on at least a first media leg quality measurement and a second media leg quality measurement of the plurality of media leg quality measurements, generating a respective end-to-end performance measure for each of the inward media path and the outward media path;

determining a quality for each of the inward media path and the outward media path to yield an inward media path quality and an outward media path quality, and determining an overall quality for the communication session based on the end-to-end performance measure for the inward media path and the end-to-end performance measure for the outward media path and the inward media path quality and the outward media path quality.

10. The system of claim 9, wherein the computer-readable medium stores additional instructions which, when executed by the processor, cause the processor to perform further operations comprising displaying one of an indication, a summary, or a representation of the overall quality.

11. The system of claim 9, wherein the computer-readable medium stores additional instructions which, when executed by the processor, cause the processor to perform further operations comprising generating an indication based on the overall quality, wherein the indication comprises one of an alert, a message, an image, an audio, a video, a report, an event, a response, a text, or a signal.

12. The system of claim 9, wherein the computer-readable medium stores additional instructions which, when executed by the processor, cause the processor to perform further operations comprising generating a media quality indication based on at least one of the respective end-to-end performance measure for the inward and outward media paths.

13. The system of claim 9, wherein the end-to-end performance measure is based on at least one of a codec, a jitter, a delay, or a packet loss of two or more of the plurality of media legs.

14. A computer-readable medium storing instructions which, when executed by a processor, cause the processor to perform operations comprising:
identifying an inward media path associated with a communication session and an outward media path associated with the communication session, based on Real-time Transport Protocol Control Protocol (RTCP) messages propagated from nodes in the inward media path and the outward media path to a plurality of collectors, each of the inward media path and the outward media path comprising a plurality of media legs, wherein the inward media path is associated with incoming traffic associated with the communication session and the outward media path is associated with outgoing traffic associated with the communication session;
receiving, at a central location and from the plurality of collectors, a plurality of media leg quality measurements contained in the RTCP messages, each of the plurality of media leg quality measurements being associated with a respective media leg of the plurality of media legs;
based on at least a first media leg quality measurement and a second media leg quality measurement of the plurality of media leg quality measurements, generating a respective end-to-end performance measure for each of the inward media path and the outward media path;

determining a quality for each of the inward media path and the outward media path to yield an inward media path quality and an outward media path quality; and determining an overall quality for the communication session based on the end-to-end performance measure for the inward media path and the end-to-end performance measure for the outward media path and the inward media path quality and the outward media path quality.

15. The computer-readable medium of claim 14, storing additional instructions which, when executed by the processor, cause the processor to perform further operations comprising generating an indication based on the overall quality, wherein the indication comprises one of an alert, a message, an image, an audio, a video, a report, an event, a response, a text, or a signal.

16. The computer-readable medium of claim 14, storing additional instructions which, when executed by the processor, cause the processor to perform further operations comprising generating a media quality indication based on at least one of the respective end-to-end performance measures.

17. The computer-readable medium of claim 14, wherein the end-to-end performance measure is based on at least one of a codec, a jitter, a delay, or a packet loss of two or more of the plurality of media legs.

18. The computer-readable medium of claim 14, further comprising displaying one of an indication, a summary, or a representative of the overall quality.

19. The computer-readable medium of claim 14, further comprising displaying a media quality indication based on at least one of the respective end-to-end performance measures for the plurality of media paths.

20. The computer-readable medium of claim 14, wherein determining the respective end-to-end performance measure is based on a triggering event.

* * * * *